United States Patent Office 3,450,749
Patented June 17, 1969

3,450,749
ORGANIC SULFONATE PRODUCTION AND
PURIFICATION
Clarence L. Furrow, Bartlesville, Okla., assignor to
Phillips Petroleum Company, a corporation of
Delaware
No Drawing. Filed Feb. 10, 1966, Ser. No. 526,355
Int. Cl. C07c 139/12; C07d 1/00, 139/12
U.S. Cl. 260—513                              6 Claims

ABSTRACT OF THE DISCLOSURE

Extraction of alkali metal bisulfites from mixtures containing same and alkali metal alkylsulfonates by a multiple stage water extraction process.

---

This invention relates to a process for the production and purification of organic sulfonates. In another aspect, this invention relates to an improved process for the production of organic sulfonate from an unsaturated hydrocarbon and a bisulfite, wherein unreacted bisulfite is removed by a multiple stage extraction. In accordance with another aspect, this invention relates to a process for the removal of alkali metal bisulfites considered contaminants in mixtures containing same by subjecting the mixture to a multiple stage water extraction under conditions such that the bisulfite is preferentially extracted. In accordance with still another aspect, in the production of organic sulfonates by the reaction of an alkene or cycloalkene with an alkali metal bisulfite in the presence of a reaction promoter, the effluent from said reaction is subjected to repeated water extraction under conditions of temperature wherein the bisulfite is preferentially extracted in the presence of the sulfonate.

There is considerable interest in the production of biodegradable detergents. Considerable research has been directed to the discovery of processes for the economical production of these biodegradable detergents. While a greater proportion of the research work in biodegradable detergents has been devoted to the preparation of alkyl benzene sulfonates wherein the alkyl group has a relatively unbranched structure, considerable research effort has been devoted to the synthesis of alkyl sulfates, alkylsulfonates, and the like.

A wide variety of processes have been proposed for the production of detergent materials. One type of detergent which is receiving considerable attention is the organic sulfonate class. One method which has been proposed for the preparation of organic sulfonates is the reaction of unsaturated hydrocarbons including alkenes and cycloalkenes with alkali metal bisulfites in the presence of various types of reaction promoters. Since excess bisulfite is customarily employed to achieve high yields of product alkali metal organic sulfonate, the product material contains unreacted alkali metal bisulfite as a contaminant.

According to the present invention, I provide an improved process for removing unreacted alkali metal bisulfite contaminants in the production of alkali metal organic sulfonates.

Accordingly, an object of my invention is to provide an improved process for the production and purification of organic sulfonates.

Another object of my invention is to provide a process for the removal of contaminating amounts of alkali metal bisulfites from alkali metal organic sulfonates.

A further object of this invention is to provide a process for the purification of alkali metal organic sulfonates wherein substantially pure organic sulfonate is obtained.

Other aspects, objects and the several advantages of this invention will be readily apparent to those skilled in the art from the following description and the appended claims.

According to the invention, it has been found that alkali metal bisulfites can be effectively removed from mixtures containing same by subjecting the mixture to multiple stage water extraction by carrying out the extraction at conditions such that the solubility of the alkali metal bisulfite is substantially higher than the solubility of the other materials present in the mixture.

In accordance with one embodiment of the invention, I provide a process for the separation of alkali metal bisulfites from alkali metal organic sulfonates containing alkali metal bisulfite as an impurity by subjecting same to multiple stage water extraction at a temperature such that the water preferentially extracts the bisulfite in the presence of the organic sulfonate.

In accordance with a further embodiment of my invention, in the preparation of organic sulfonates by reacting an alkene or cycloalkene with an alkali metal bisulfite in the presence of a reaction promoter, the reaction mass containing alkali metal organic sulfonate and unreacted alkali metal bisulfite is subjected to multiple stage water extraction to selectively remove bisulfite in the presence of organic sulfonate wherein the bisulfite is extracted with water at a temperature such that the solubility of the alkali metal bisulfite is substantially higher than the solubility of the alkali metal organic sulfonate.

A variety of methods can be employed for the preparation of the alkali metal organic sulfonates which are to be recovered by the process of my invention. Broadly speaking, the alkali metal organic sulfonates are prepared by reaction of an alkene or cycloalkene with an alkali metal bisulfite in the presence of a diluent and in the presence of certain reaction promoters. In carrying out my invention, I prefer to utilize the methods for the preparation of alkali metal organic sulfonates set forth in my copending applications described below.

In accordance with Ser. No. 376,556, filed June 19, 1964, now U.S. 3,356,717, organic sulfonates are produced by the addition of an alkali metal bisulfite to an alkene having at least 12 carbon atoms per molecule in the presence of water and a novel initiator-solvent combination, wherein said initiator of said combination is selected from the group consisting of tert-butyl peracetate, tert-butyl perisobutyrate, the salt of azobisisobutyramidine and mixtures thereof, and said solvent is selected from the group consisting of pyridine, ethanol, isopropanol, n-propanol, and mixtures thereof.

In accordance with Ser. No. 414,893, filed Nov. 30, 1964, now abandoned, organic sulfonates are prepared by a process which comprises contacting an olefin with an oxygen-containing gas and thereafter contacting the pretreated olefin with an alkali metal or ammonium bisulfite in the presence of a mixed solvent system comprising water and at least one polar organic solvent.

In accordance with Ser. No. 502,594, filed Oct. 22, 1965, now U.S. 3,336,210, organic sulfonates are prepared by the reaction of an alkene with a bisulfite in the presence of electromagnetic radiation, a mixed solvent system comprising water and a polar organic solvent and a hydrocarbon or dye promoter.

In accordance with Ser. No. 464,858, filed June 17, 1965, now U.S. 3,337,437, organic sulfonates are produced by the addition of a bisulfite to an alkene in the presence of ultraviolet and/or visible light and in the presence of a polar organic solvent and water mixture and preferably in the presence of an inorganic oxidizing agent.

In accordance with Ser. No. 465,776, filed June 21, 1965, now abandoned, organic sulfonates are prepared by the reaction of an alkene with a bisulfite employing ultraviolet and/or visible light as an initiator and a ketone as a promoter.

As indicated above, the instant invention is applicable to the purification of alkali metal organic sulfonates containing alkali metal bisulfite contaminant prepared by any of the known procedures. Whatever method is used, the reaction mixture at the end of the reaction will contain water, polar organic solvent, unreacted alkene, unreacted alkali metal bisulfite and product alkali metal organic sulfonate.

Alkenes which are reacted with bisulfite according to the process of this invention will generally contain from about 5 to about 20 carbon atoms per molecule. While the process of this invention is suitable for the reaction of the bisulfite compounds with straight chain monoolefins, branched chain monoolefins and cyclic monoolefins, it is particularly applicable to the reaction of bisulfite compounds with straight chain olefins, preferably 1-olefins. As used herein, the term alkene includes acyclic and cyclic monoolefins, including alkyl, cycloalkyl and aryl substituted derivatives thereof. Mixtures of alkenes can be employed in the process of the invention. Some specific examples of olefins which can be reacted with bisulfite compounds according to the process of this invention include 1-pentene, 2-methyl-1-butene, 1-hexene, 2-heptene, 1-octene, 1-decene, 3-undecene, 1-dodecene, 1-eicosene, 4-methyl-1-pentene, 2-methyl-1-pentadecene, 4-ethyl-2-octadecene, cyclopentene, cyclohexene, 4-ethylcyclohexene, cyclooctene, cyclodecene, cyclododecene, cyclohexadecene, cycloeicosene, 4-cyclohexyl-1-butene, 3-phenyl-1-butene, 6-phenyl-1-hexene, 3-phenylcyclopentene, and the like.

The bisulfite employed in the process of my invention has a formula $MHSO_3$, wherein M is selected from the group consisting of sodium, potassium, lithium, rubidium and cesium. Specific examples of such bisulfite compounds are sodium bisulfite, potassium bisulfite, lithium bisulfite, rubidium bisulfite and cesium bisulfite. The concentration of the bisulfite compound in the reaction zone preferably is sufficient to provide from 1 to 1.5 mols of the bisulfite compound per mol of alkene feed to the reaction zone. It is within the scope of this invention to employ larger amounts of bisulfite compound when desirable. The bisulfite compound can be introduced directly into the reaction zone or it can be introduced into the reaction zone as a water solution of the bisulfite compound.

The above reactions are ordinarily conducted in the presence of a mixed solvent system comprising water and at least one polar organic solvent selected from tert-butyl alcohol, n-propyl alcohol, isopropyl alcohol, ethyl alcohol and pyridine. The quantity of water present in the reaction zone will generally range from about 0.5 to about 10 grams of water per gram of bisulfite compound present in the reaction zone. The organic solvent/water volume ratio in the reaction zone will generally range from about 0.1:1 to 2:1.

The temperature of the reaction zone wherein the alkene is reacted with the bisulfite compound can vary widely, generally ranging from the freezing point of the reaction mixture up to the boiling point of the reaction mixture, and preferably from 15 to 50° C. The pressure within the reaction zone will generally be autogenous or can range from about atmospheric up to about 500 p.s.i., depending upon the reaction temperature, the reaction solvent system, and the like. The time of reaction will generally range from a few minutes to 50 hours or even longer.

The reaction for the production of alkali metal organic sulfonate can be conducted either batch-wise or continuous. The constituents in the reaction mixture can be introduced independently in the reaction zone or the various constituents can be premixed and introduced into the reaction zone as a mixture or mixtures.

Examples of organic sulfonates which can be purified in accordance with this invention include:

lithium 1-pentanesulfonate
sodium 2-methyl-1-butanesulfonate
sodium 1-hexanesulfonate
potassium 2-heptanesulfonate
rubidium 1-octanesulfonate
cesium 1-decanesulfonate
lithium 3-undecanesulfonate
sodium 1-dodecanesulfonate
potassium 1-eicosanesulfonate
sodium 4-methyl-1-pentanesulfonate
potassium 2-methyl-1-pentadecanesulfonate
lithium 4-ethyl-2-octadecanesulfonate
lithium cyclopentanesulfonate
sodium cyclohexanesulfonate
potassium 4-ethylcyclohexanesulfonate
rubidium cyclooctanesulfonate
cesium cyclodecanesulfonate
sodium cyclododecanesulfonate
potassium cyclohexadecanesulfonate
sodium cycloeicosanesulfonate
potassium 4-cyclohexyl-1-butanesulfonate
sodium 6-phenyl-1-hexanesulfonate
and the like.

In carrying out the invention prior to subjecting the mixture obtained in the above-described reactions to multiples stage water extraction of this invention, the polar organic solvent and unreacted alkene, for example, are removed. After the reaction is complete, the reaction mixture can be subjected to an evaporation step wherein water, alkene and the organic solvent, are separated from the organic sulfonates. While any suitable method can be employed, this step can be carried out most conveniently by evaporating the mixture to dryness, which of course, also removes the water which was present in the reaction mixture. This evaporation can be conveniently carried out under vacuum to avoid high temperatures, but other methods such as spray drying can also be employed.

The dried mixture obtained after evaporation comprises a mixture of alkali metal bisulfite and product alkali metal organic sulfonate. In accordance with the present invention, this material is then subjected to multiple stage extraction with water, or, if desired, can be further treated by dissolving the dried material in hot water, filtering to remove any material insoluble in hot water and, again, evaporating to dryness by the procedures described previously.

In actual operation, the dried alkali metal bisulfite-alkali metal organic sulfonate mixture is contacted with water at a temperature such that the water solubility of the alkali metal bisulfite impurity is substantially higher than the water solubility of the desired alkali metal organic sulfonate. While this temperature can vary somewhat depending upon the molecular weight of the alkali metal organic sulfonate being purified, the temperature will generally range from 0 up to 70° C., and preferably will not be above about 50° C. The amount of water employed in each stage can also vary, but will generally range from 1 to 10 cc. of water per gram of mixture being extracted.

The time of contacting of the water with the mixture can also vary appreciably, for example, from a few minutes to several days, depending upon the temperature of and degree of mixing. It is advantageous to agitate the mixture so as to obtain good contact.

Following contact of the water, the aqueous phase is separated from the insoluble material by such methods as filtration, centrifugation, decantation, and the like. The separated insoluble material, alkali metal organic sulfonate having a lower alkali metal bisulfite content, is then subjected to another stage of water extraction. The number of stages required will depend upon the desired purity, as one skilled in the art can readily determine the bisulfite content of the product and continue with additional stages until alkali metal organic sulfonate of the desired purity is obtained.

As used in this application, the term organic sulfonate includes alkylsulfonates in which the alkyl group can contain cycloalkyl or aromatic radicals as substituents and cycloalkylsulfonates in which the cycloalkyl group can contain alkyl or aromatic radicals as substituents.

The organic sulfonates produced by the process of this invention have wide utility, particularly in the detergent and wetting agent field. For example, the reaction of dodecene with sodium bisulfite according to the process of this invention produces sodium dodecylsulfonate in high purity and good yield. This produced organic sulfonate is an excellent detergent material.

EXAMPLE

A run was carried out in which sodium dodecylsulfonate was prepared by the reaction of 1-dodecene with sodium bisulfite and subsequently purified by the process of this invention.

In this run, 170 ml. of tert-butyl alcohol, 170 ml. of water, 40.4 grams (0.24 mole) of 1-dodecene, 31.2 grams (0.3 mole) of $NaHSO_3$ and 0.05 gram of the dye Phosphin R (S.O. 687) were charged to a 500 ml. 4-necked quartz flask fitted with a mechanical stirrer, two water-cooled cooling fingers condenser and thermometer. After the charging, the flask was irradiated with the light from sixteen 2537 Angstrom ultraviolet lamps for 4.5 hours at 33° C. The yield of sodium dodecylsulfonate was then determined by the procedure of ASTM D1681–59T, using cetyl trimethylammonium bromide as the titrant. The yield of sodium dodecylsulfonate was 77 percent.

The entire reaction mixture was evaporated to dryness, after which the dry material, a mixture of sodium dodecylsulfonate and unreacted sodium bisulfite, was dissolved in hot water. The solution was then filtered, and the solution was evaporated to dryness. The weight of dry, hot water-soluble material was 62.2 grams. This material was then stirred with 250 cc. of water at 25° C. for 15 hours, after which the undissolved material was filtered out and weighed. The weight of material removed was 42.8 grams. The remaining solid material was again extracted with 250 cc. of water, while stirring, at room temperature for 15 hours. In this second stage, 1.8 grams of material was removed. In the third and fourth stages, carried out at the same conditions, 0.5 gram of material was removed in each stage. After the fourth stage, the remaining solid was dried and weighed, and found to weigh 15.2 grams. The starting material weighed 62.2 grams, and a total of 45.6 grams of material was removed by the four stages of extraction. A small amount of material was lost by mechanical losses which accounts for the discrepancy in the material balance. The 15.2 grams of material was analyzed and found to consist of 100 percent sodium dodecylsulfonate.

The above example clearly demonstrates that the water extraction process of this invention allows one to recover pure alkali metal alkylsulfonates from the reaction of an olefin such as 1-dodecene with an alkali metal bisulfite.

Reasonable variation and modification are possible within the scope of the foregoing disclosure and the appended claims to the invention, the essence of which is that alkali metal bisulfites are separated from mixtures containing same by subjecting the mixture to multiple stage water extraction.

I claim:

1. A process for extracting alkali metal bisulfites from mixtures containing same and alkali metal organic sulfonates prepared from alkenes and cycloalkenes having from 5–20, inclusive, carbon atoms which comprises subjecting said mixture to multiple stage extraction at a temperature in the range 0–70° C. in each stage such that the water selectively extracts the bisulfite in the presence of the sulfonate.

2. A process according to claim 1 wherein said bisulfite is sodium bisulfite and said sulfonate is a sodium organic sulfonate.

3. A process according to claim 1 wherein said bisulfite is sodium bisulfite and said sulfonate is sodium dodecyl sulfonate.

4. A process according to claim 1 wherein the amount of water employed in each stage ranges from 1 to 10 cc. of water per gram of mixture being extracted.

5. A process according to claim 1 wherein said mixture prior to being subjected to multiple stage water extraction is evaporated to dryness to leave a mixture comprised principally of alkali metal bisulfite and alkali metal organic sulfonate and further wherein the dry mixture is contacted with water at a temperature not above 50° C. to selectively extract alkali metal bisulfite from said dry mixture and subjecting the extracted mixture thus obtained reduced in alkali metal bisulfite to repeated water extractions under conditions of temperature conducive to the selective extraction of alkali metal bisulfite until substantially 100 percent alkali metal sulfonate is obtained as product.

6. A process according to claim 5 wherein said bisulfite is sodium and said sulfonate is sodium dodecyl sulfonate.

References Cited

Morton: Laboratory Technique in Organic Chemistry, pages 195 and 196 (1938), McGraw-Hill, New York, N.Y.

DANIEL D. HORWITZ, *Primary Examiner.*

U.S. Cl. X.R.

260—503, 505